United States Patent
Chiang et al.

(10) Patent No.: US 9,537,524 B2
(45) Date of Patent: Jan. 3, 2017

(54) PROTECTIVE CASE

(71) Applicant: HTC Corporation, Taoyuan (TW)

(72) Inventors: Meng-Sheng Chiang, Taoyuan (TW);
Hung-Chuan Wen, Taoyuan (TW);
Chun-Ta Huang, Taoyuan (TW);
Chih-Sung Fang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/686,782

(22) Filed: Apr. 15, 2015

(65) Prior Publication Data
US 2016/0308571 A1    Oct. 20, 2016

(51) Int. Cl.
*H04M 1/00*    (2006.01)
*H04B 1/3888*    (2015.01)
*H04M 1/11*    (2006.01)

(52) U.S. Cl.
CPC .............. *H04B 1/3888* (2013.01); *H04M 1/11* (2013.01)

(58) Field of Classification Search
CPC .................................................. H04B 1/3888
USPC .................................................... 455/575.8
See application file for complete search history.

(56) References Cited

U.S. PATENT DOCUMENTS

| | | | |
|---|---|---|---|
| 4,940,204 A | | 7/1990 | Nelson et al. |
| 8,936,229 B2* | | 1/2015 | Zhu .......................... H04M 1/04 248/688 |
| 2014/0200056 A1 | | 7/2014 | Liu |
| 2016/0026218 A1* | | 1/2016 | Jefferies ................ G06F 1/1628 455/575.8 |

FOREIGN PATENT DOCUMENTS

| | | |
|---|---|---|
| CN | 102529093 | 7/2012 |
| CN | 203789350 | 8/2014 |
| TW | M408223 | 7/2011 |
| TW | M479645 | 6/2014 |
| TW | M488034 | 10/2014 |

OTHER PUBLICATIONS

"Office Action of Taiwan Counterpart Application", issued on Nov. 17, 2015, p. 1-p. 6, in which the listed references were cited.

* cited by examiner

*Primary Examiner* — Sanh Phu
(74) *Attorney, Agent, or Firm* — Jianq Chyun IP Office

(57) ABSTRACT

A protective case is suitable for partially wrapping an electronic device. The protective case includes a casing, a kickstand and an elastic strip. The casing is suitable for partially wrapping the electronic device. The kickstand is connected to the casing. The elastic strip is located within the kickstand and elastically deforms to change a shape of the kickstand. When the casing leans against a plane, the shape of the kickstand is changed by the elastic deformation of the elastic strip so that the kickstand supports the casing in relative to the plane.

10 Claims, 4 Drawing Sheets

PROTECTIVE CASE

FIELD OF THE APPLICATION

The application relates to a protective case, and more particularly, to a protective case used to partially wrapping an electronic device and capable of providing a support function.

DESCRIPTION OF RELATED ART

Due to their diverse functions and thin design, tablet devices such as the smart phone and the tablet computer are very popular among consumers. As a result, relevant accessories are also vigorously developed. In particular, accessories such as the protective case and the protective sleeve are most popular among consumers. The protective case usually covers the peripheral edges and the back side of a tablet device and exposes a display, a speaker, a microphone, a camera and other elements of the tablet device, so as to ensure that those elements can function normally.

SUMMARY OF THE APPLICATION

The application is directed to a protective case used to provide a support function.

The protective case of the application is suitable for partially wrapping an electronic device. The protective case includes a casing, a kickstand and an elastic strip. The casing is suitable for partially wrapping the electronic device. The kickstand is connected to the casing. The elastic strip is located within the kickstand and elastically deforms to change a shape of the kickstand. When the casing leans against a plane, the shape of the kickstand is changed by the elastic deformation of the elastic strip, so that the kickstand supports the casing in relative to the plane.

In view of the above, in the application, when it is in need to support the casing and the electronic device, the shape of the kickstand can be changed by the elastic deformation of the elastic strip, so that the kickstand can support the casing and the electronic device in relative to the plane.

In order to make the aforementioned features and advantages of the present invention more comprehensible, embodiments accompanying figures are described in detail below.

DESCRIPTION OF THE EMBODIMENTS

Figure 1A:
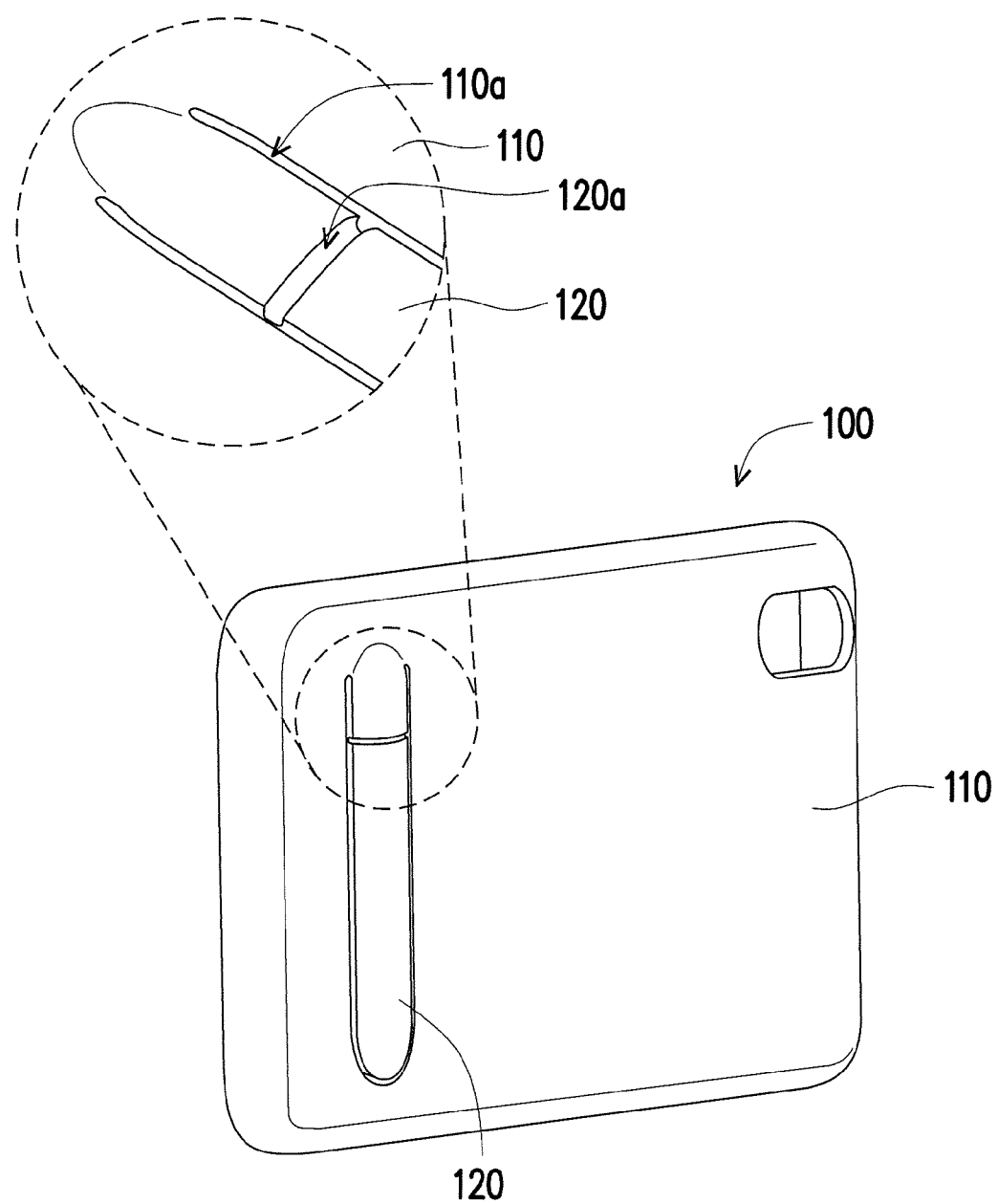
FIG. 1A is a rear view of a protective case according to an embodiment of the invention before a kickstand thereof is deformed.
Figure 1B:
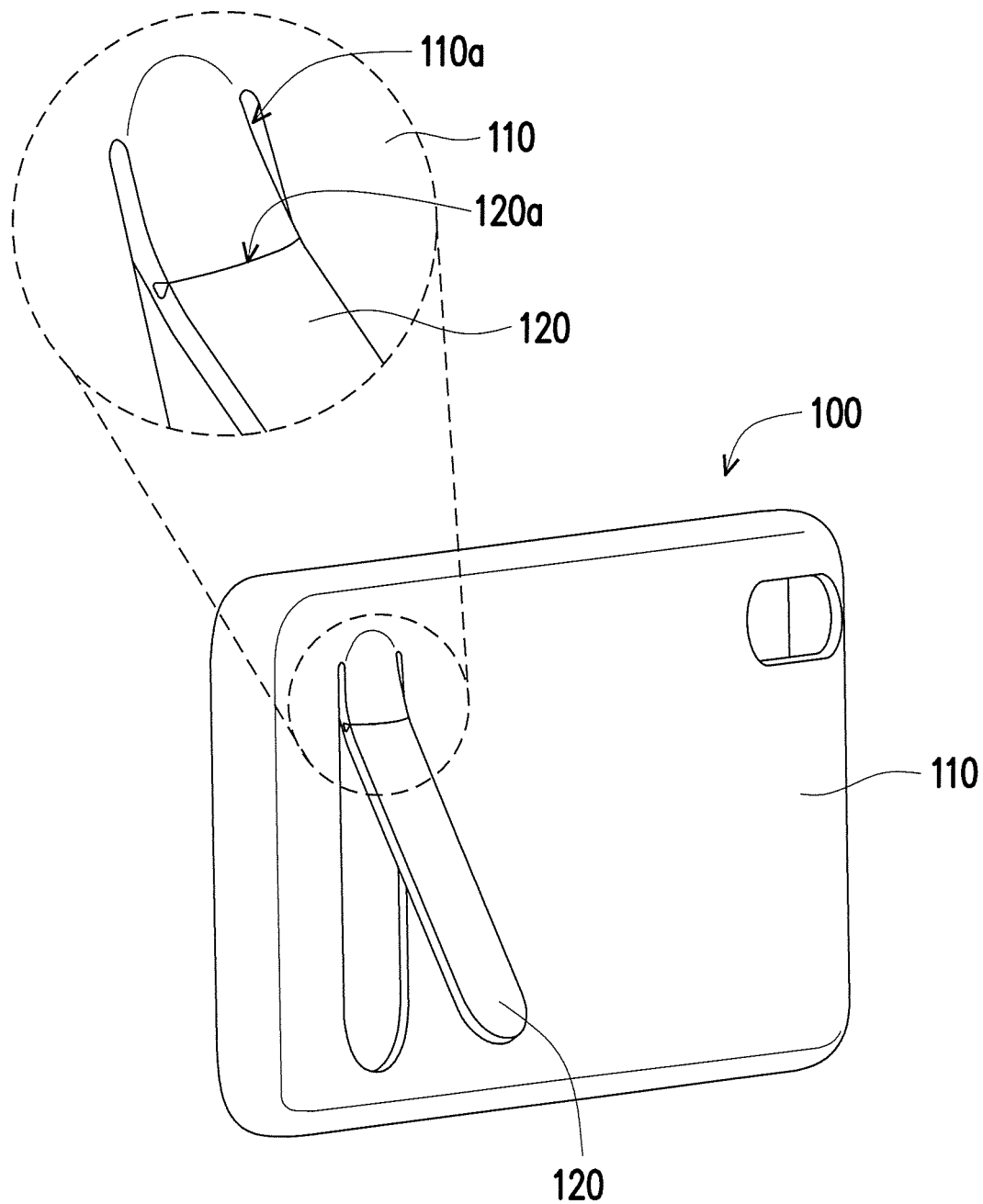
FIG. 1B is a rear view of the protective case of FIG. 1A after the kickstand thereof is deformed.
Figure 2A:
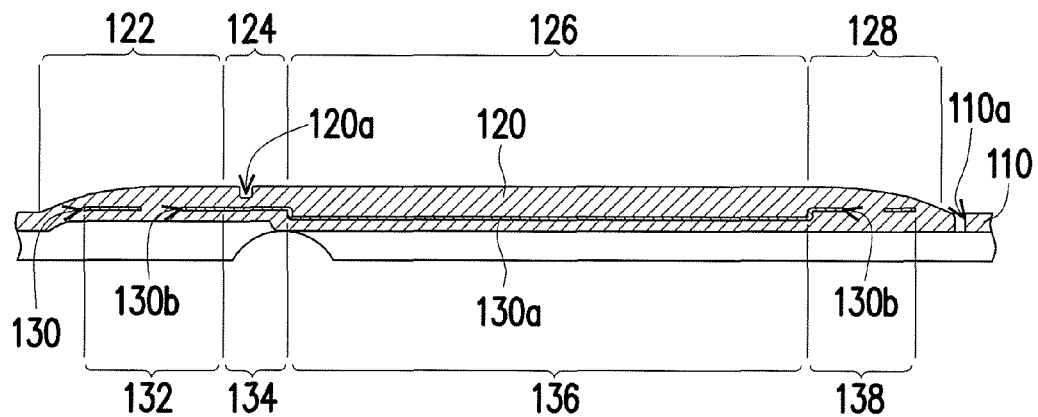
FIG. 2A is a cross-sectional view of the protective case of FIG. 1A along the undeformed kickstand.
Figure 2B:
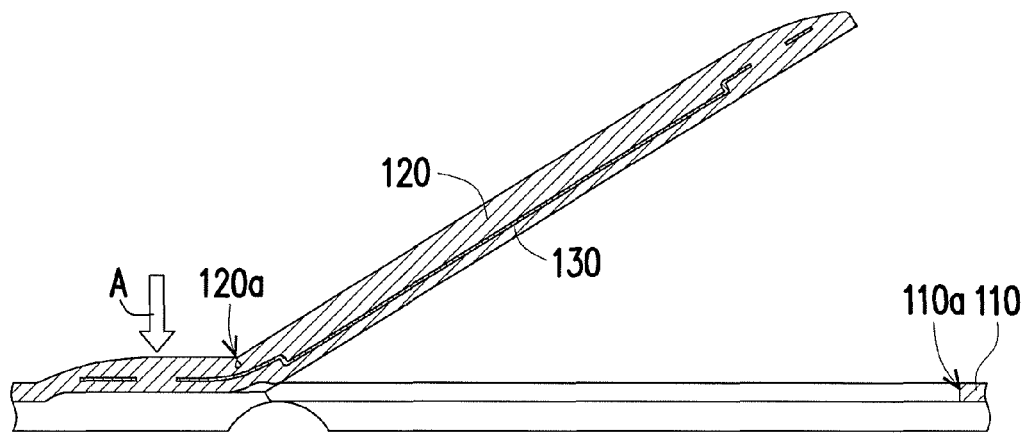
FIG. 2B is a cross-sectional view of the protective case of FIG. 1B along the deformed kickstand.
Figure 3:
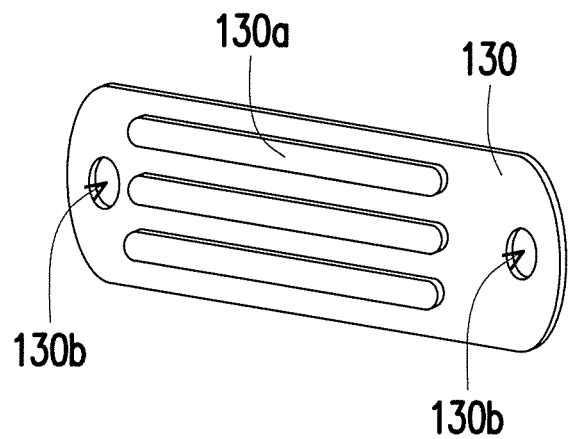
FIG. 3 is a perspective view of an elastic strip of the protective case of FIG. 1A.
Figure 4:
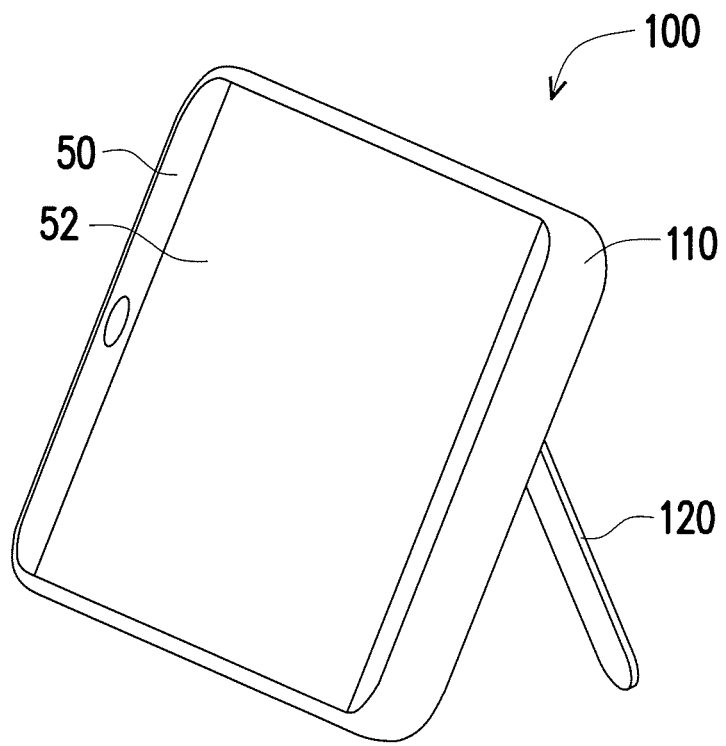
FIG. 4 is a perspective view illustrating the protective case of FIG. 1A partially wrapping an electronic device while the kickstand thereof is already deformed.

Referring to FIG. 1A and FIG. 2A, in the present embodiment, a protective case 100 is suitable for partially wrapping an electronic device 50, as shown in FIG. 4, and exposing a display screen 52 of the electronic device 50. The electronic device 50 is, for example, a smart phone. Nevertheless, in other not shown embodiment, the electronic device 50 may further be a tablet PC or any type of electronic device which has a display. The protective case 100 includes a casing 110, a kickstand 120 and an elastic strip 130. The casing 110 partially wraps the electronic device 50. The kickstand 120 is connected to the casing 110. The elastic strip 130 is located within the kickstand 120 and elastically deforms to change a shape of the kickstand 120. A three-dimensional shape of the elastic strip 130 is illustrated in FIG. 3. As shown in FIG. 1B and FIG. 2B, when the casing 110 leans against a plane, the shape of the kickstand 120 is changed by the elastic deformation of the elastic strip 130, so that the kickstand 120 supports the casing 110 in relative to the plane. The elastic strip 130 herein may be a conventional elastic steel strip, which can transform between two shapes with an elasticity thereof, such as transform between a straight-strip shape and a spiral shape.

Referring to FIG. 1A and FIG. 2A again, in the present embodiment, the casing 110 has an opening 110a, and the kickstand 120 is located in the opening 110a and connected to the casing 110. Thus, a U-shaped gap is existed between the casing 110 and the kickstand 120, and the kickstand 120 and the casing 110 are harmonized with each other in terms of appearance. In addition, the kickstand 120 may be integrally formed with the casing 110. A material of the casing 110 and the kickstand 120 may include rubber or other flexible materials. In other embodiment, the casing 110 and the kickstand 120 may also have different materials.

Referring to FIG. 1B and FIG. 2B, in the present embodiment, the kickstand 120 has a stand fixing section 122, a stand bending section 124, a stand extension section 126 and a stand end section 128 that are connected to each other in sequence. The stand fixing section 122 is connected to the casing 110. The elastic strip 130 has a strip fixing section 132, a strip bending section 134, a strip extension section 136 and a strip end section 138 that are connected to each other in sequence, and the strip fixing section 132, the strip bending section 134, the strip extension section 136 and the strip end section 138 are respectively located within the stand fixing section 122, the stand bending section 124, the stand extension section 126 and the stand end section 128.

Referring to FIG. 1B and FIG. 3 again, in the present embodiment, the elastic strip 130 protrudes arcuately towards a direction opposite to a back side 112 of the casing 110. Hence, as shown in FIG. 2A and FIG. 2B, an elastic deformation of the strip bending section 124 may be triggered by pressing the strip fixing section 122 along a direction A, so as to change the shape of the kickstand 120.

Referring to FIG. 1B and FIG. 3 again, in the present embodiment, the elastic strip 130 has a plurality of protruding ribs 130a located at the strip extension section 136 for reducing the elastic deformation of the strip extension section 136, and thereby also reduces a deformation of the stand extension section 126. Moreover, in the present embodiment, a thickness of the stand extension section 126 may be increased in relative to a thickness of the stand bending section 124, so as to reduce an elastic deformation of the strip extension section 134. In other words, the thickness of the stand extension section 126 is greater than the thickness of the stand bending section 124, so as to reduce an elastic deformation of the strip extension section 136.

Referring to FIG. 1A and FIG. 2A again, the kickstand 120 has a groove 120a, the groove 120a is located at the stand bending section 124, and when the strip bending section 134 is elastically deformed to deform the stand bending section 124, two opposite sidewalls of the groove 120a are leaned against each other to limit a degree of bending of the stand bending section 124, thereby determining a degree of tilt of the stand extension section 126 of the kickstand 20 relative to the casing 110.

Referring to FIG. 1B and FIG. 3 again, the elastic strip 130 has two communication holes 130b, and a plurality of portions of the kickstand 120 respectively passes through the communication holes 130b to closely connect the kickstand with the elastic strip. In the present embodiment, the communication holes 130b are respectively located at the strip fixing section 132 and the strip end section 138, but are not limited thereto.

In summary, in the application, when it is in need to support the casing and the electronic device, the shape of the kickstand can be changed by the elastic deformation of the elastic strip, so that the kickstand can support the casing and the electronic device in relative to the plane. When it is not in need of supporting the casing and the electronic device, the shape of the kickstand may also be changed by the elastic deformation of the elastic strip, so that the kickstand and the casing can re-harmonized with each other in terms of appearance. In addition, through forming the protruding ribs on the strip extension section of the elastic strip or by increasing the thickness of the stand extension section of the kickstand, the degree of bending of the stand extension section can be adjusted according to practical requirements and thereby can be prevented from being overly bent. Moreover, the degree of bending of the stand bending section can be limited by the groove formed on the kickstand.

Although the application has been described with reference to the above embodiments, the application is not limited to the above embodiments. It is apparent to one of ordinary skill in the art that modifications and variations to the described embodiments may be made without departing from the spirit and scope of the application. Accordingly, the scope of the application will be defined by the attached claims.

What is claimed is:

1. A protective case, suitable for partially wrapping an electronic device, the protective case comprising:
   a casing, suitable for partially wrapping the electronic device;
   a kickstand, connected to the casing; and
   an elastic strip, located within the kickstand and being elastically deformed to change a shape of the kickstand, wherein when the casing leans against a plane, the shape of the kickstand is changed by an elastic deformation of the elastic strip, so that the kickstand supports the casing in relative to the plane.

2. The protective case as recited in claim 1, wherein the kickstand and the casing are integrally formed.

3. The protective case as recited in claim 1, wherein a material of the casing and the kickstand comprises rubber.

4. The protective case as recited in claim 1, wherein the casing has an opening, and the kickstand is located in the opening and connected to the casing.

5. The protective case as recited in claim 1, wherein the kickstand has a stand fixing section, a stand bending section, a stand extension section and a stand end section that are connected to each other in sequence, the stand fixing section is connected to the casing, the elastic strip has a strip fixing section, a strip bending section, a strip extension section and a strip end section that are connected to each other in sequence, and the strip fixing section, the strip bending section, the strip extension section and the stand end section are respectively located within the stand fixing section, the stand bending section, the stand extension section and the stand end section.

6. The protective case as recited in claim 5, wherein the elastic strip protrudes arcuately towards a direction opposite to the back side, and an elastic deformation of the strip bending section is triggered by pressing the strip fixing section, so as to change the shape of the kickstand.

7. The protective case as recited in claim 5, wherein the elastic strip has at least one protruding rib located at the strip extension section, so as to reduce an elastic deformation of the strip extension section.

8. The protective case as recited in claim 5, wherein a thickness of the stand extension section is greater than a thickness of the stand bending section so as to reduce the elastic deformation of the strip extension section.

9. The protective case as recited in claim 5, wherein the kickstand has a groove, the groove is located at the stand bending section, and when the strip bending section is elastically deformed to deform the stand bending section, two opposite sidewalls of the groove are leaned against each other to limit a degree of bending of the stand bending section.

10. The protective case as recited in claim 5, wherein the elastic strip has a communication hole, and a portion of the kickstand passes through the communication hole to closely connect the kickstand with the elastic strip.

* * * * *